United States Patent [19]

Adman et al.

[11] Patent Number: 4,522,269

[45] Date of Patent: Jun. 11, 1985

[54] DUAL MOTOR TORQUE DELIVERING TOOL

[75] Inventors: Nils G. Adman, Huddinge; Rolf A. Jacobsson, Johanneshov, both of Sweden

[73] Assignee: Atlas Copco Aktiebolag, Nacka, Sweden

[21] Appl. No.: 442,769

[22] Filed: Nov. 18, 1982

[30] Foreign Application Priority Data

Nov. 23, 1981 [SE] Sweden .............................. 8106935

[51] Int. Cl.[3] .............................................. B23Q 5/06

[52] U.S. Cl. .......................................... 173/12; 60/424; 81/470; 173/1

[58] Field of Search .................... 60/462, 424; 91/519, 91/514, 517; 137/118, 119; 81/470, 469; 173/12, 1, 5, 2, 52

[56] References Cited

U.S. PATENT DOCUMENTS

| | | | |
|---|---|---|---|
| 3,073,123 | 1/1963 | Hodgson et al. | 60/424 |
| 3,507,173 | 4/1970 | Wallace | 81/470 |
| 3,529,513 | 9/1970 | Amtsberg . | |
| 3,686,983 | 8/1972 | Flagge | 81/470 |
| 3,791,458 | 2/1974 | Wallace | 173/12 |
| 4,113,080 | 9/1978 | Thackston et al. | 173/12 |

*Primary Examiner*—Donald R. Schran
*Assistant Examiner*—James Wolfe
*Attorney, Agent, or Firm*—Frishauf, Holtz, Goodman and Woodward

[57] ABSTRACT

A pneumatic power tool for tightening screw joints includes a primary motor 11 for a high speed running down sequence, a secondary motor 12 for a high torque final tightening sequence, a coupling gearing 18 providing a high ratio gearing for the secondary motor 12, a gearing of a substantially lower ratio for the primary motor 11 and a one-way clutch 30 by which the secondary motor 12 is automatically engaged at decreasing tightening speed. An air supply valve 33 substantially reduces the air consumption of the tool by keeping the air supply to the secondary motor 12 shut off until a certain degree of tightness in the joint is obtained, after which the valve 33 is opened and the secondary motor 12 is energized.

6 Claims, 6 Drawing Figures

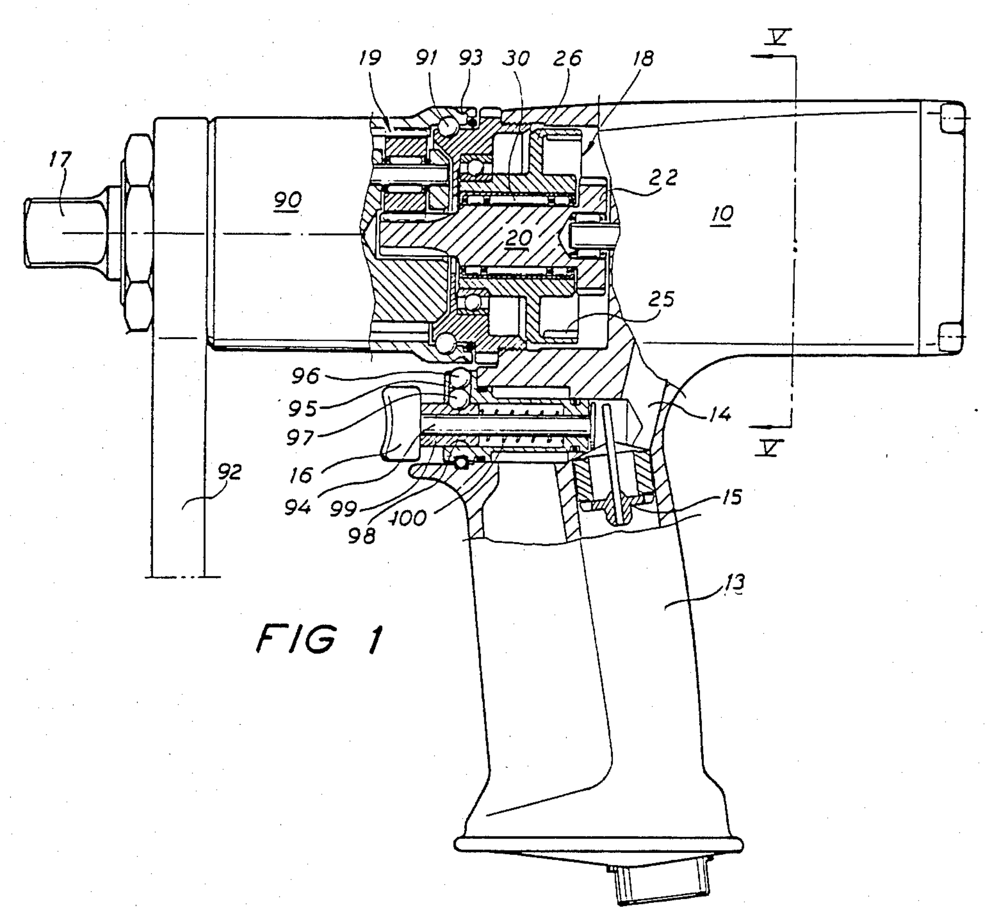
FIG 1
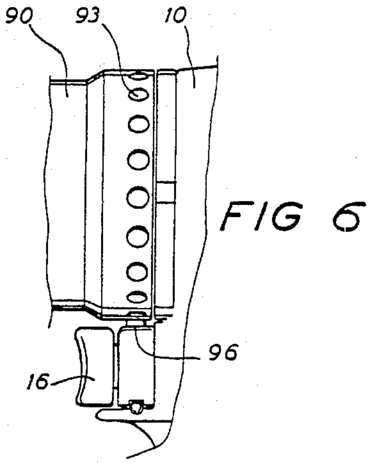
FIG 6
FIG 5
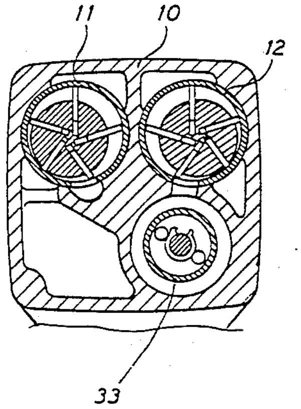

DUAL MOTOR TORQUE DELIVERING TOOL

BACKGROUND OF THE INVENTION

This invention relates to a pneumatic power tool for tightening screw joints. Particularly, the invention concerns a screw joint tightening tool of the type including a housing, a primary motor for obtaining an initial degree of tightness in the joint, a secondary motor for obtaining the desired final degree of tightness in the joint and a power train for transferring the power of the motors to an output spindle connectable to the joint.

A tool of this type is disclosed in U.S. Pat. No. 3,529,513.

A problem concerned with previous power tools of this type is high air consumption. Of the dual motor nut running tools available today, both motors are simultaneously supplied with pressure air during the entire tightening process. This means that the secondary motor which always operates at a lower gear than the primary motor to accomplish the final degree of tightness in the joint runs unloaded during the initial stage of the process. By such an idle running of the secondary motor there is a considerable waste of pressure air, and, in addition to an undesirably high energy cost. Switching over to this fast working type of tool from the more common single motor tool of impacting or stalling type may give the result that very expensive measures have to be taken to up-size the compressor unit and the air distribution net.

In a further aspect of the high level of air consumption from which today's dual motor tools suffer it would be very difficult to adapt these tools to the specifications of a portable tool. Firstly, the required air supply and exhaust conduits can not be flexible and light enough to enable a comfortable handling of the tool, and, secondly, the air passages inside the tool housing, including a throttle valve, would have to be of such dimensions that the outer dimensions and weight of the tool housing would be unacceptable for a portable tool.

SUMMARY OF THE INVENTION

The main object of the present invention is to accomplish a pneumatic dual motor screw joint tightening device by which the pressure air consumption is effectively reduced. Up to a fifty percent reduction is achievable.

Another object of the invention is to accomplish a pneumatic dual motor nut running tool comprising a pressure air supply valve which is arranged to act at a certain difference between the back pressure from the high speed low torque motor and the actual air source pressure to control the supply of motive air to the low speed high torque motor.

Further objects and advantages are apparent from the following detailed description and the claims.

BRIEF DESCRIPTION OF THE DRAWINGS

FIG. 1 shows a partly broken side elevation of a portable power wrench having the characterizing features of the invention.

FIG. 5 shows a cross section taken along line V—V in FIG. 1.

FIG. 6 shows a fractional side view of the tool in FIG. 1.

DETAILED DESCRIPTION

Figure 2:
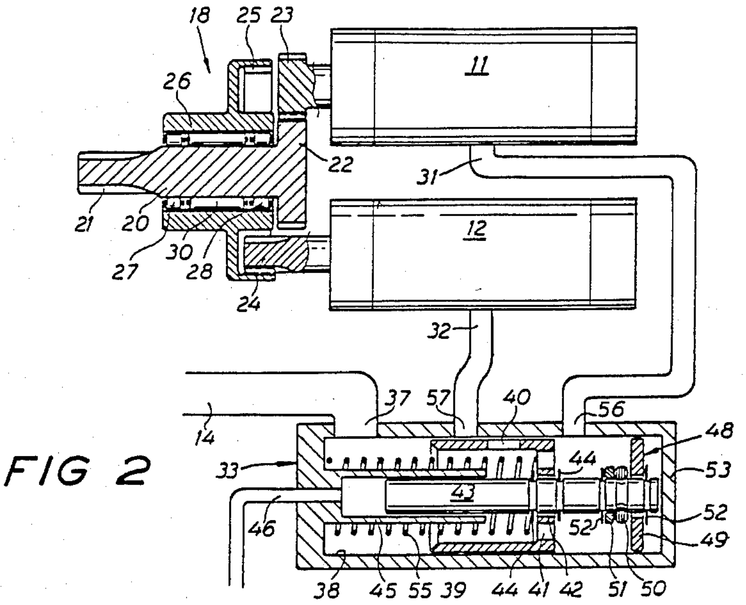
FIG. 2 illustrates schematically a power tool according to the invention. The air supply valve is shown in its closed position.

The power tool illustrated in the drawing figures is a pneumatically powered nut runner which comprises a housing 10 in which there are supported a primary motor 11 and a secondary motor 12. Both motors are of the pneumatic sliding vane type which is the predominantly used type of motor in this type of tool. The motors are of equal size and rotate in opposite directions. See FIG. 5.

The shown tool is a portable tool and the housing 10 is formed with a piston grip 13 through which the main air supply passage 14 of the tool extends. A throttle valve 15 mounted in pistol grip 13 is operable by a trigger 16 to control the pressure air flow through the air supply passage 14.

The motors 11 and 12 are arranged to deliver torque to a square ended output spindle 17 via a coupling gearing 18 and a reduction gearing 19. (See FIG. 1). The latter comprises two conventional planet gears which are not shown in detail.

The coupling gearing 18 comprises a central shaft 20 formed at its forward end with gear teeth 21 for engagement with the reduction gearing 19. At its rear end the central shaft 20 is provided with a spur gear 22 which is engaged by a smaller spur gear 23 directly driven by the primary motor 11. A small diameter spur gear 24 directly driven by the secondary motor 12 engages the internal gear 25 of a coupling sleeve 26. The latter is rotatively journalled on the central shaft 20 by means of two axially spaced roller bearings 27, 28. Between these roller bearings 27, 28 there is located a one-way clutch 30 permitting free rotation of the central shaft 20 relative to the coupling sleeve 26 in the screw joint tightening direction. The clutch 30 is a free-wheeling roller type clutch of any conventional design and is not described in detail.

In the shown coupling 18, the reduction ratio of the spur gear 23/spur gear 22 drive coupled to the primary motor 11 is 2:1, whereas the reduction ratio of the spur gear 24/internal gear 25 drive coupled to the secondary motor 12 is about 7,5:1. Hence, the speed reduction of the secondary motor 12 is about 3,75 times the speed reduction of the primary motor 11. This coupling gearing 18 offers in combination a compact design and a considerably high speed reduction ratio for the secondary motor 12.

The two motors 11 and 12 are provided with air inlets 31 and 32, respectively, through which the motors are supplied with pressure air from a supply valve 33. To this end, the supply valve 33 is provided with an air inlet port 37 communicating with the main air supply passage 14 in the housing 10.

The air supply valve 33 comprises a cylinder bore 38 and a valve element 39 displacealby guided therein. The valve element 39 is cup-shaped having a valve opening 40 in its peripheral wall and a number of air communication openings 41 extending through its bottom or end wall. In the end wall of the valve element 39 there is also a central opening 42 through which a rod 43 extends. The rod 43 and valve element 39 are axially interlocked by lock rings 44.

At its one end, to the left in FIG. 2, the rod 43 is guidingly received in a tube portion 45 coaxially mounted in the cylinder bore 38. The bottom end of the tube portion 45 communicates with the atmosphere via a passage 46. Like the clearance seal between the valve element 39 and the cylinder bore 38, the rod 43 and the tube portion 45 cooperate to prevent pressure air supplied through the air inlet port 37 from leaking out to the atmosphere through passage 46.

The rod 43 extends right through the valve element 39 and carries on its right hand end an oscillation damping device 48 comprising a damping piston 49, an O-ring 50 and a support ring 51. All three elements are prevented from axial movement by two lock rings 52. The damping piston 49 fits in the cylinder bore 38 with a circumferential clearence, but is received on the rod 43 with a circumferential gap which is wider than that at the outer peripheri. This means both that air may pass by the damping piston 49 through the gaps and that the damping piston 49 is freely movable relative to the rod 43, within very narrow axial limits of course.

The valve element 39, the rod 43 and the damping device 48 are shiftable together as a unit in the cylinder bore 38 between ultimate end positions defined by the ends of the rod 43 hitting the bottom wall of the tube portion 45 and the right hand end wall 53 of the cylinder bore 38, respectively. A weak coil spring 55 is arranged to bias the entire unit to the right in the figures, thereby making sure that the valve element 39 is always in its right hand end position as the tool is started.

Figure 3:
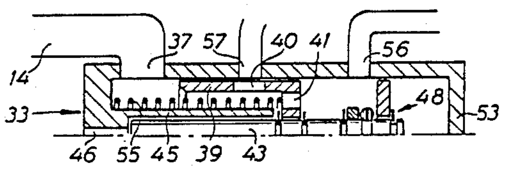
FIG. 3 shows a fragmental section through the air supply valve when occupying its open position.

In addition to the air inlet port 37, the cylinder bore 38 is provided with a first service port 56 communicating with the air inlet 31 of the primary motor 11 and a second service port 57 communicating with the inlet 32 of the secondary motor 12. As can be seen in FIGS. 2 and 3, the air inlet port 37 and the first service port 56 are located in the cylinder bore 38 in such a way that they are never covered by the valve element 39. The second service port 57 is covered by the valve element 39 as the latter occupies its right hand position but is uncovered through the valve opening 40 as the valve element 39 is shifted to its left hand position.

The operation order of the device shown in FIGS. 2 and 3 is the following:

Before supplying pressure air at all to the valve 33 as well as during the initial sequence of a screw joint tightening process the valve element 39 occupies its right hand position as shown in FIG. 2. When pressure air is not supplied to the valve 33 the bias load of spring 55 ensures that the valve element 39 occupies its right hand position, i.e. the closed position.

The tool is started by pressing the trigger 16 to open the throttle valve 15. Then pressure air is supplied to the tool via passage 14.

During the initial sequence of operation, pressure air enters the valve 33 via the inlet port 37, passes through the openings 41 in the valve element 39 and reaches the primary motor 11 via the first service port 56 and the air inlet 31 of that motor.

The primary motor 11 starts rotating the central shaft 20 via spur gears 23 and 22, and the power developed by the primary motor 11 is transferred to the output spindle 17 via the reduction gearing 19. During the running down sequence of the process the resistance to rotation generated in the screw joint being tightened is low which means that the rotation speed of the primary motor 11 as well as the air flow through the supply valve 33 is high.

As the pressure air passes through the openings 41 in the valve element 39 there is generated a pressure drop across these openings. This means that the pressure on the right hand side of the valve element 39 is lower than the pressure on the opposite side thereof, i.e. the pressure of the pressure air source to which the tool is connected. However, the difference in load acting on the valve element 39 in the two opposite directions is not as big as this pressure difference indicates, because one portion of the cross sectional area of the left side of the valve element 39, namely the surface portion represented by the cross section of the rod 43 is exposed to atmospheric pressure only due to the venting passage 46. At its opposite end, the rod 43 is exposed to the same pressure as the valve element. The damping piston 49 does not have any real influence upon the pressure acting on the right hand side thereof.

The sizes of the different surfaces of the valve element 39 as well as the size of the openings 41 are chosen in such a way that when the screw joint resistance increases and the rotation speed of the primary motor 11 slows down to a certain extent there is obtained a distinct increase in the back pressure from the primary motor 11. At a predetermined degree of tightness in the screw joint the back pressure from the primary motor 11 is high enough to cause the valve element 39 to move to the left and occupy its open position, thereby making valve opening 40 register with the second service port 57. See FIG. 3. Without interrupting the air supply to the primary motor 11, the supply valve 33 now provides the secondary motor 12 with pressure air.

The secondary motor 12 is energized to carry out together with the primary motor 11 the final tightening sequence. The output torque of the secondary motor 12 is transferred to the coupling sleeve 26 via the spur gear 24 and the internal gear 25. The gear ratio of this internal gear/spur gear arrangement is much higher than that of the spur gear/spur gear arrangement coupled to the primary motor 11. This means that the coupling sleeve 26 is rotated slower and at a higher torque level than what the central shaft 20 originally did. However, due to increased resistance in the screw joint being tightened, the primary motor 11 has slowed down to such a low speed level that the secondary motor 12 is able to catch up, and, by means of the oneway clutch 30, the power of secondary motor 12 is delivered to the central shaft 20 and added to the power still generated by the primary motor 11.

When the desired final degree of tightness is obtained in the screw joint, the motors 11 and 12 stop rotating, either by stalling as a result of the total back pressure from the motors being substantially equal to a pre-set air source pressure or as a result of the closing of a back pressure responsive shut off valve. The latter is not shown but may be of any conventional design and located upstream of the supply valve 33.

The damping device 48 is employed to prevent the valve element 39 from oscillating and to ensure an accurate operation of the supply valve 33. To that end, the damping piston 49 is arranged to obstruct to some extent the air flow from or to the right hand end portion of the cylinder bore 38. It is desirable, though, to have a less efficient damping of the valve element 39 during its movement to the left, i.e. towardits open position, than during movement in the opposite direction. By the circumferential gap between the damping piston 49 and the rod 43, there is established a second air passage past the damping piston 49. This passage, however, is open only when the valve element 39, rod 43 and damping piston 49 are moved to the left. When moving to the right, the damping piston 49 is brought into sealing contact with the O-ring 50, thereby sealing off the second air passage and provide a more efficient damping action.

Figure 4:
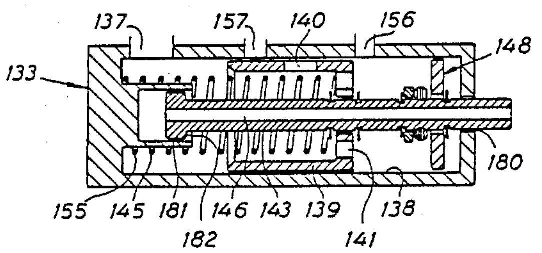
FIG. 4 shows a longitudinal section through the air supply valve of a modified embodiment.

In FIG. 4, there is shown a modified embodiment of the air supply valve carrying the reference numeral 133. The purpose and the main operation order is about the same as for the above described valve. A characteristic feature of the valve according to FIG. 4 is the differently designed rod 143 which comprises a coaxial vent passage 146 and which at its right hand end extends out through an opening 180 in the cylinder end wall 153. Thereby, communication is established between on one hand the chamber formed by the tube portion 145 and the rod 143 and on the other hand the atmosphere. At its left hand end, the rod 143 is formed with a head 181. This head 181 is sealingly guided in the tube portion 145, and due to the vent passage 146 it is exposed to atmospheric pressure on its left end surface. The head 181 also forms an annular shoulder 182 which is exposed to the air source pressure.

The way of operation of the supply valve according to the embodiment shown in FIG. 4 is very similar to that of the valve shown in FIGS. 2 and 3. This means that the valve element 139 is balanced between the air source pressure and the back pressure from the primary motor. In the previous embodiment, the big difference between the pressure related forces acting on the valve element 39 in the two opposite directions is compensated for by having the left end surface of the rod 43 vented to the atmosphere, while the right end surface is exposed to the primary motor back pressure.

In the valve shown in FIG. 4, the right end surface of the rod 143 is acted upon by the atmospheric pressure only. The reduced force derived therefrom and which is active to load the rod 143 to the left is made up for by the air source pressure acting on the annular shoulder 182.

Apart from these differences the principle of operation is the same in the two valve embodiments. Accordingly, the valve element 139 of the valve shown in FIG. 4 is biased towards its right hand or closed position by the spring 155. This means that the valve element 139 occupies its closed position before the tool is activated at all. However, as the initial stage of the tightening process has commenced the force emanating from the pressure drop across the openings 141 will dominate over the bias force generated by spring 155. In this closed position the second service port 157 in the cylinder bore 138 is covered by the valve element 139, and, accordingly, motive air is prevented from reaching the secondary motor 12. When the torque resistance from the screw joint being tightened increases to a certain level the back pressure from the primary motor 11 causes the valve element 139 to shift to its open position. In this position the valve opening 140 of the valve element 139 registers with the secand service port 157 and pressure air is supplied to the secondary motor 12. In both positions of the valve element 139 the air inlet port 137 as well as the first service port 156 are open.

The oscillation damping device 148 of this embodiment is equally designed and operates in a manner equal to that of the previously described embodiment.

An advantage creditable to both embodiments is the independency of a certain air source pressure. In other words, the valve operates properly also when the pressure of the supplied air for one reason or another deviates from standard pressure, usually 6 bars. A pressure reduction of a couple of bars is not unusual at the connection points of tools like this. However, the air supply valves described above are balanced between the feed pressure and the back pressure from the primary motor 11, which means that the pressure level itself is not important. It is to be noted that the bias spring 55, 155 is too weak to influence on the valve operation.

Referring again to FIG. 1, it is to be seen that the reduction gearing 19 of the tool is enclosed in a casing 90 which is rotatively supported on the tool housing 10 by means of a ball bearing 91. The latter forms a swivel connection between the housing 10 and the reduction gearing casing 90. To the forward end of the casing 90 there is rigidly attached a torque reaction bar 92 which is intended to be put into a firm contact with a stationary object like a projecting portion on either of the parts being clamped together by the joint being tightened. The reason is that the torque reaction is too heavy to be manually balanced by the tool operator.

The purpose of the swivel connection is to enable a quick and comfortable adjustment of the reaction bar to find a firm and safe support point for the latter without spoiling the possibility for the operator to hold the pistol grip in a confortable position.

In previous single motor tool applications, a plain freely rotating swivel connection is satisfactory, because the reaction torque transferred from the motor alone to the tool housing is low enough to be harmless to the operator. In the dual motor tool shown in FIG. 1, however, the torque reaction transferred to the tool housing 10 is substantially heavier. The reason is that the coupling gearing 18 itself provides a speed reduction/torque amplification, in particular the spur gear—inner gear drive of the secondary motor 12.

In order to protect the operator from the reation torque developed in the housing 10, the casing 90 is provided a circumferential row of notches 93 which are of hemispherical shape and equally distributed over the peripheri of the rear end of the casing 90. See FIGS. 1 and 6. Between the casing 90 and the stem 94 of the trigger 16, there is a vertical bore 95 in which two steel balls 96, 97 are movably guided. The bore 95 is located in the same vertical plane as the notches 93 to enable the upper ball 96 to engage one of the notches 93. On the trigger stem 94 there is slidably guided a lock sleeve 99, and a spring 100 is arranged to generate a bias load on the lock sleeve 99 in the direction of the trigger 16.

The lock sleeve 99 is provided with a circumferential groove 98 which is of such a size and is so located as to partly receive the lower ball 97 when the trigger 16 occupies its rest position. This position is shown in FIG. 2. The size of the balls 96, 97 is adapted to the distance between the trigger stem 94 and the casing 90 such that when the trigger 16 is pulled to start the tool and, because of that the groove 98 is moved out of register with the bore 95, the upper ball 96 is locked in its engagement with one of the notches 93 on the casing 90. In other words, when the tool is activated the casing 90 is always locked relative to the tool housing 10. This means that all reaction forces developed in the tool are balanced through the reaction bar 92.

When the trigger 16 occupies its rest position, as in FIG. 2, the lower ball 97 enters the groove 98 and permits the upper ball 96 to disengage the notches 93 and enable rotation of the casing 90 relative to the housing 10. In a further aspect, the trigger 16 can not be moved in case no one of the notches 93 is in register with the bore 95 to receive the upper ball 96. This means that the tool can not be activated unless the housing 10 is locked relative to the reduction gear casing 90 and the reaction bar 92.

It is to be noted that the embodiments are not limited to the above described examples but may freely be varied within the scope of the invention as claimed.

1. In a pneumatic power tool for tightening threaded joints, comprising a housing (10), an air supply passage (14) in said housing (10) communicating with an external pressure air source, a primary motor (11) for obtaining an initial degree of pretension in the joint, a secondary motor (12) for obtaining together with said primary motor (11) the desired final degree of pretension in the joint, said primary and secondary motors (11, 12) each having an air inlet, and a power train (18, 19) for transmitting the power of said primary motor (11) and said secondary motor (12) to an output spindle connectable to the joint, the improvement comprising:

an air supply valve (33; 133) which includes a cylinder bore (38; 138) in the housing (10) and a valve element (39; 139) which is sealingly guided in said cylinder bore (38; 138), said cylinder bore (38; 138) having an inlet port (37; 137) communicating with said air supply passage (14), a first service port (56; 156) communicating with said air inlet of said primary motor (11), and a second service port (57; 157) communicating with said air inlet of said secondary motor (12), said valve element (39; 139) being arranged in said clyinder bore (38; 138) to control only said second service port (57; 157), said valve element (39; 139) being shiftable between a second service port (57; 157) covering position and a second service port uncovering position, and said valve element (39; 139) being balanced between the air pressure in said air supply passage (14) and the back pressure from said primary motor (11) such that an increased back pressure from said primary motor (11) as said initial degree of pretension is reached causes said valve element (39; 139) to move from said second service port covering position to said second service port uncovering position, thereby energizing said secondary motor (12).

2. The power tool of claim 1, wherein said air supply valve (33; 133) includes a balancing piston (43; 143) connected to said valve element (39; 139), said balancing piston comprising a surface continuously acted upon by the atmospheric pressure in the closing direction of said valve element (39; 139).

3. The power tool of claim 2, wherein said balancing piston (143) further comprises an auxiliary surface (182) pressurized by the air source pressure in the opening direction of said valve element (139).

4. The power tool of claim 2, wherein said balancing piston comprises a rod (43; 143) which is coaxial with and secured to said valve element (39; 139).

5. The power tool of claim 3 or 4, wherein said valve element (39; 139) has at least one opening (41; 141) therein, through which air under a certain pressure drop is communicated from said inlet port (37; 137) to said first service port (56; 156).

6. The power tool of any one of claims 1, 2, 3, or 4, further comprising a damping piston (49) movably guided in said bore (38; 138), wherein said valve element (39; 139) is connected to said damping piston and is provided with a check valve element (50) for reducing the damping action in the second service port uncovering direction of said valve element (39; 139).

* * * * *